No. 737,395. Patented August 25, 1903.

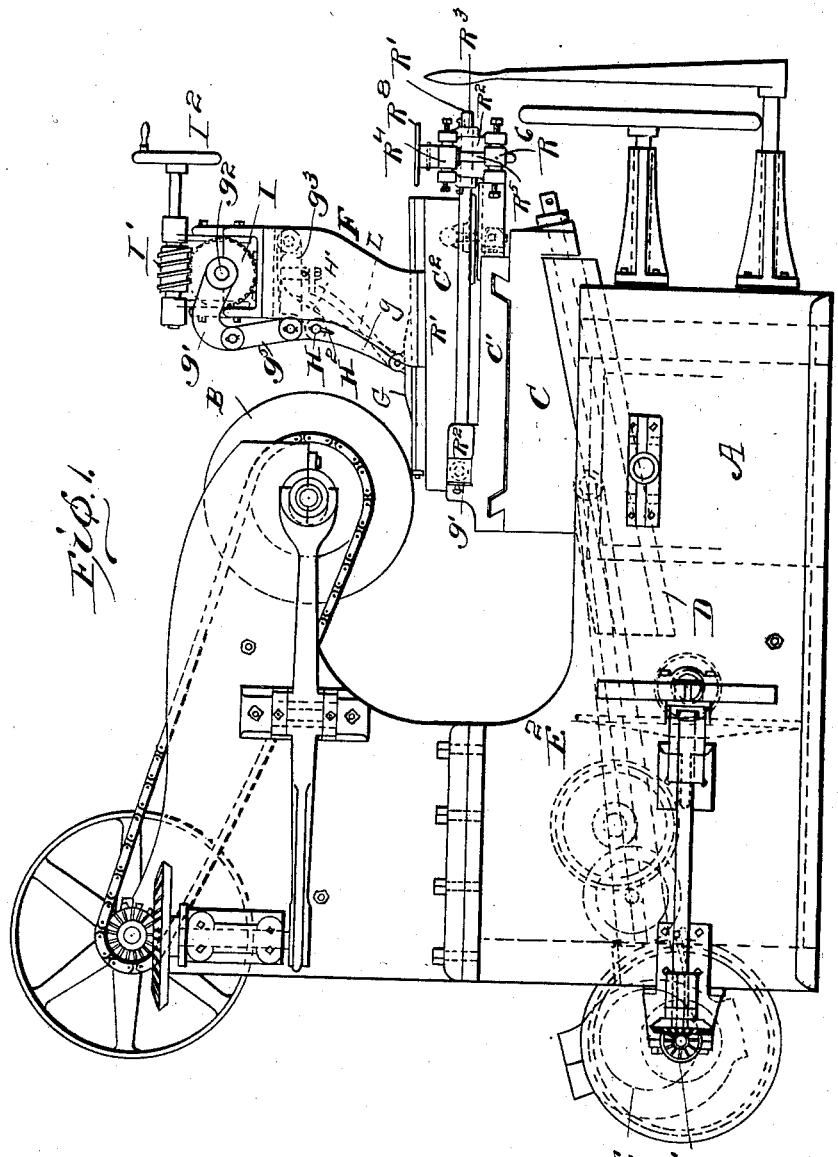

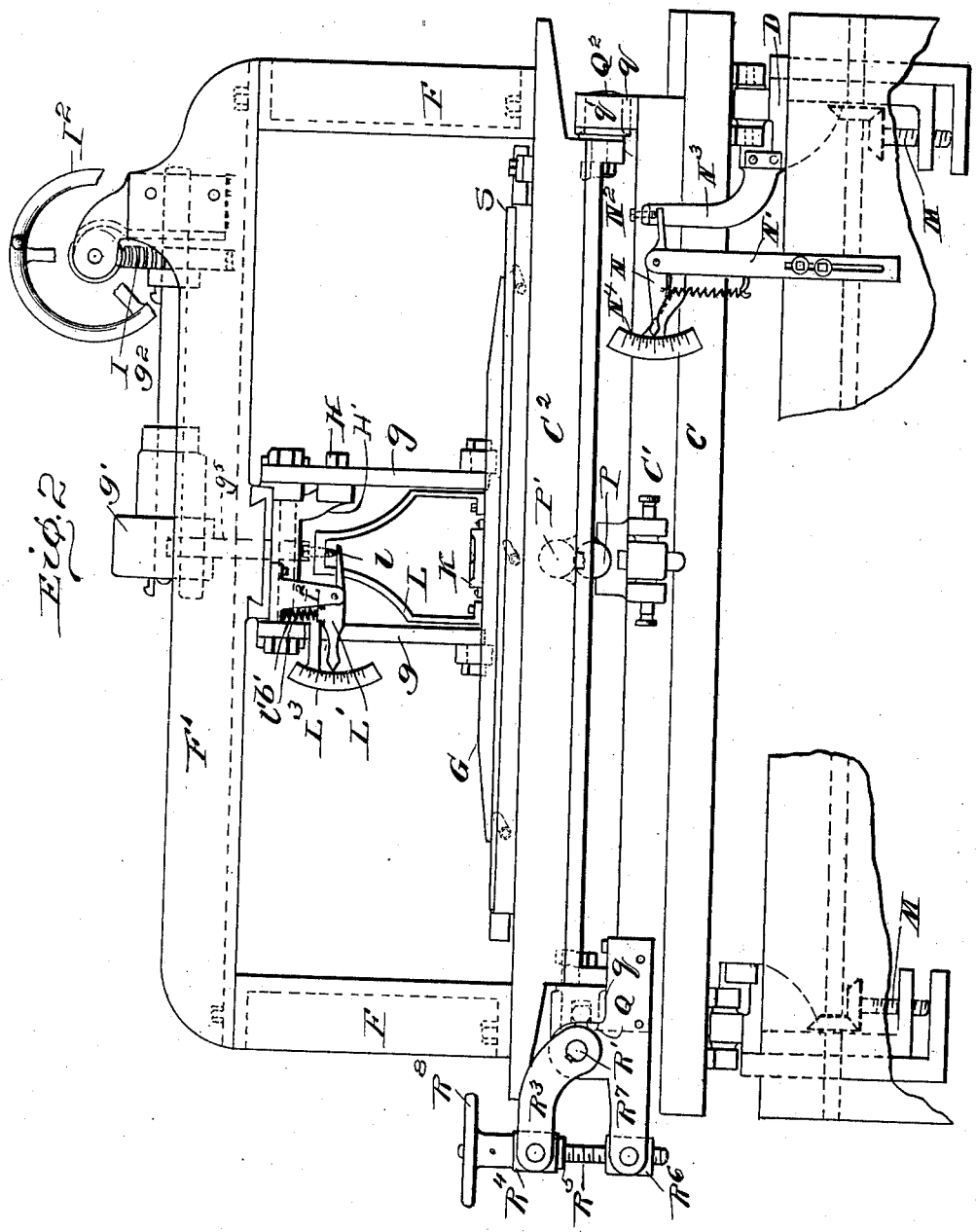

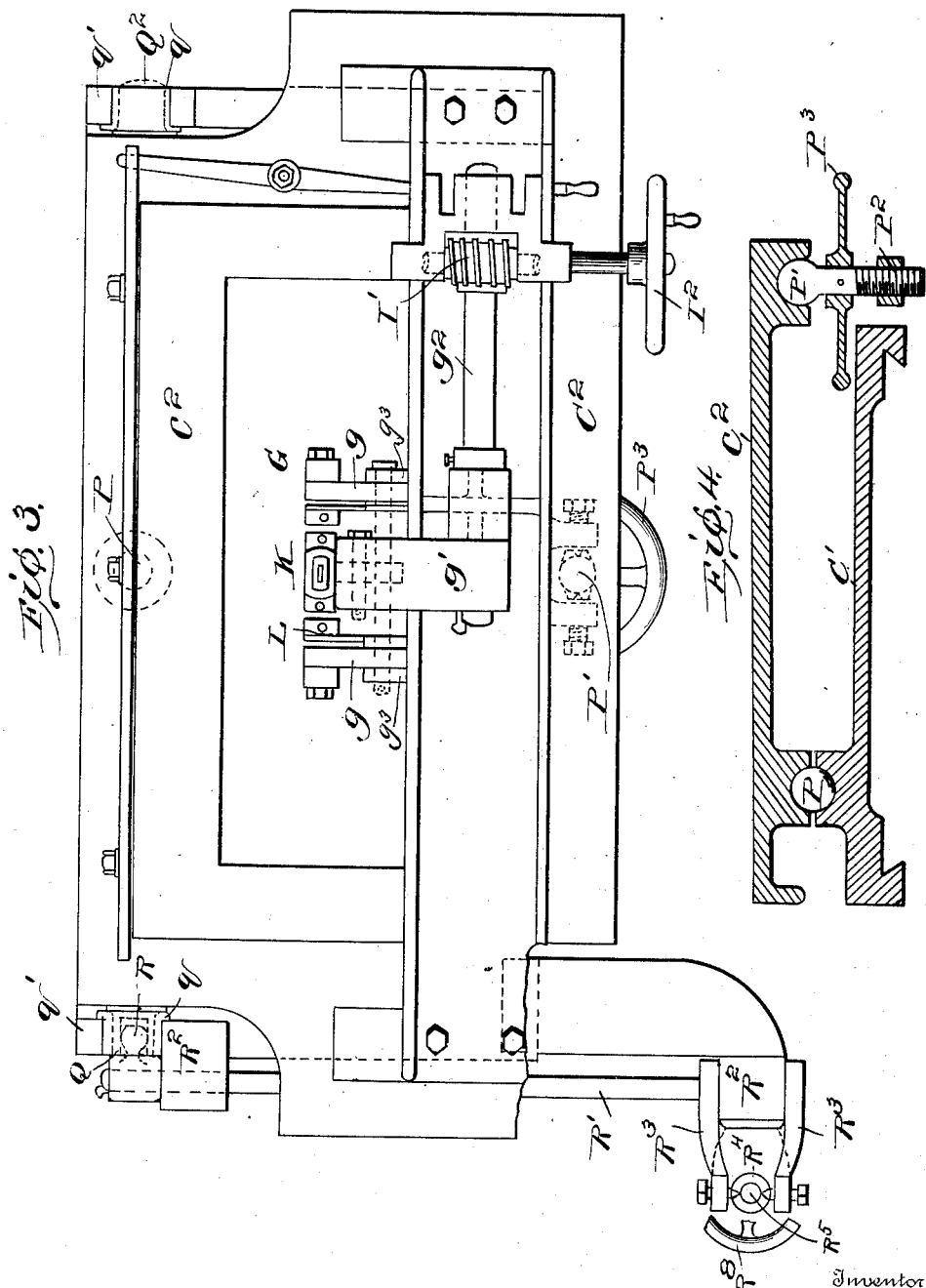

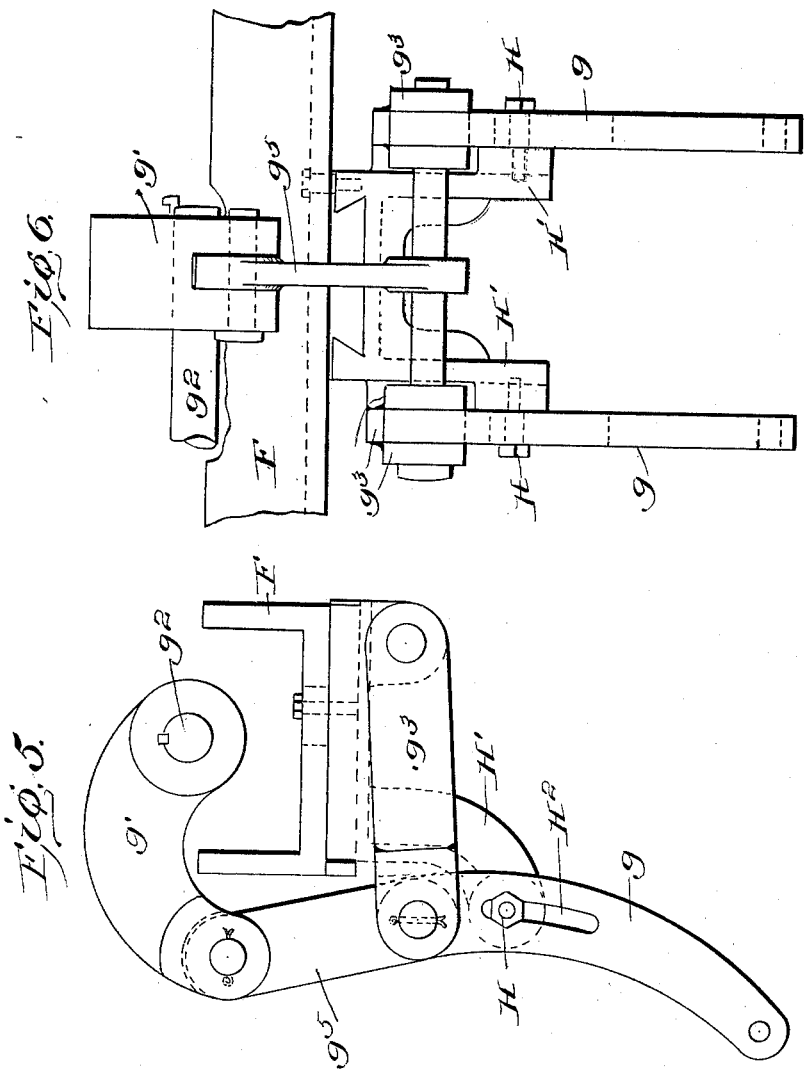

UNITED STATES PATENT OFFICE.

CHARLES L. GOEHRING AND WILLIAM TROCHE, OF AKRON, OHIO; SAID TROCHE ASSIGNOR TO SAID GOEHRING.

GLASS-GRINDING MACHINE.

SPECIFICATION forming part of Letters Patent No. 737,395, dated August 25, 1903.

Application filed June 2, 1903. Serial No. 159,774. (No model.)

*To all whom it may concern:*

Be it known that we, CHARLES L. GOEHRING and WILLIAM TROCHE, of Akron, in the county of Summit, State of Ohio, have invented certain new and useful Improvements in Glass-Grinding Machinery; and we do hereby declare the following to be a full, clear, and exact description of the same, reference being had to the accompanying drawings, forming a part of this specification, and to the letters of reference marked thereon.

This invention relates to improvements in machinery for grinding glass, the invention being more especially, though not exclusively, adapted for use in connection with machines for forming bevels on the edges of glass plates by grinding, the objects of the invention being to provide a means whereby the face-surface of the glass plate may be conveniently and easily brought into proper alinement and position with reference to the grinder to permit of the formation of bevels of uniform width and depth with reference to said face-surface. Means for accomplishing this end are particularly desirable for use in grinding glass where the plates are of different thickness and the glass of individual plates is of varying thickness, such difference in variations being found to exist to a greater or less extent in all glass as it comes from the hands of the manufacturer, and consequently requires a readjustment of the machine for practically each plate operated upon.

The invention consists, primarily, in combining with a grinder and a glass-support adjustable with relation to each other, so as to position and aline the glass, of a measuring mechanism for indicating the thickness of the glass when the glass is clamped to its support and a corresponding measuring mechanism for indicating the adjustment of the support, whereby the operator by bringing these measuring instrumentalities into accord is enabled to assure himself that the glass is in proper position for effecting the desired results regardless of the thickness of the plate and of the inequalities in the plate being operated upon.

The invention further consists in certain novel details of construction and combinations and arrangements of parts, all as will be now described, and the particular features of novely pointed out in the appended claims.

Referring to the accompanying drawings, Figure 1 is a side elevation of a machine for grinding glass having the present improvements applied thereto. Fig. 2 is a front elevation showing the present improvements with so much of the machine-frame as is necessary for an understanding of the invention. Fig. 3 is a top plan view of the mechanism illustrated in Fig. 2, and Fig. 4 is a detail sectional view through the bed or glass-support.

Like letters of reference in the several figures indicate the same parts.

The present improvements are shown in connection with a machine embodying a main frame A, grinder B, rotated by any suitable means, and a table C, forming a portion of the glass-support and adapted to travel on ways D, (indicated in dotted lines, Fig. 1,) preferably in a plane inclined to the horizon and corresponding to the plane of the surface or bevel to be ground. The table C is reciprocated by suitable mechanism during the grinding operation, such mechanism, as shown, consisting of an eccentric E on the drive-shaft E' and connected with the table C by a pitman or connecting-rod $E^2$. (Also shown in dotted lines in Fig. 1.) Upon the table C there is mounted a transversely-movable table C', and upon the latter there is mounted the direct glass-support $C^2$, the manner of mounting the support $C^2$ being such that it may receive certain adjustments, as will be hereinafter pointed out. An upwardly-extending frame, preferably formed by standards F and cross-piece F', is mounted on the glass-support $C^2$ and is adapted to support a glass-clamp G, by which the glass is clamped down to the support $C^2$. The particular mechanism for adjusting the clamp G (illustrated in the accompanying drawings) consists of upwardly-extending links $g$, pivotally connected with the clamp G at their lower ends through a link $g^5$ and with rockarm $g'$ on the shaft $g^2$ at their upper ends. The links $g$ are pivotally connected with supporting-links $g^3$, the latter being in turn pivotally mounted on a bracket $g^4$, clamped to the under side of the cross-bar F' at approximately its center and preferably so as to be capable of an adjustment toward and from the grinder. To guide the clamp G and links $g$ in a definite path, the links $g$ preferably coöperate with guides, which may take the form of bolts or pins H, mounted in brackets H' and working in slots $H^2$ in the links, as will be readily understood from an inspection of Figs. 1 and 2. The shaft $g^2$, journaled in bearings on the cross-piece F', carries at one end a worm-wheel I, with which a worm I' meshes, and is adapted to be rotated by a hand-wheel $I^2$, whereby when said hand-wheel and worm are rotated the clamp G will be raised or lowered, according to the direction of rotation of the hand-wheel, and at the same time a sufficient degree of flexibility will be permitted the clamp to enable it to adapt itself to any slight inequalities in the thickness of the glass plate held between it and the support $C^2$.

The level K is located on the clamp G at approximately its center, whereby the angle of inclination assumed by the clamp when in contact with the upper face of the glass may be determined, and extending upwardly from the clamp G is a bracket or frame L, having in its upper portion a set-screw $l$, adapted to bear on one end of an indicator L', usually in the form of a lever pivotally mounted on a bracket $L^2$, depending from the cross-bar F', the indicator or lever L' being held against screw $l$ by a spring $l'$, while the end or indicating portion of the lever L' is adapted to travel over and register with graduations on a scale $L^3$, also supported from the bracket $L^2$. With such an arrangement when the scale is properly graduated to indicate zero when the clamp is in contact with the face of the glass-support $C^2$ and to indicate different thicknesses of glass which may separate the said clamp and its support it is obvious that the operator by noting the position of the indicator L' after he has clamped the glass in position may instantly determine the mean thickness of the glass, and having determined such thickness he may then adjust the height of the glass-support to present the glass to the grinder, so as to form a bevel of the predetermined depth or width. To facilitate this latter adjustment, the tracks or ways D (see Fig. 2) are vertically adjustable, as by screws M, and an indicator N, pivoted on the adjustable bracket N' on the machine-frame and corresponding in construction to the indicator heretofore described, is adapted to be moved in accordance with the adjustment of the tracks by a set-screw $N^2$, carried by a bracket $N^3$, attached to one of the tracks D. The scale $N^4$, with which the indicator coöperates, corresponds in graduations to the scale $L^3$. With the parts properly adjusted the operator may by bringing these two indicators into accord so adjust the mechanism that the face-surface of the glass plates will be brought into the same relation to the grinder regardless of the particular thickness or irregularities of any individual plate.

In setting the machine for operation it is convenient to set the grinder with its grinding-face level and to adjust the glass-support $C^2$ to a level position, as indicated by the level device K; but to facilitate this adjustment and to insure a uniformity of result the glass-support $C^2$ is mounted midway of its length at one edge upon a universal bearing, preferably formed by a ball P, seating in sockets in the support C' and $C^2$, respectively, while the front edge of said support $C^2$ is carried by a ball P', formed on the upper end of an adjusting-screw $P^2$, which may be adjusted by a hand-wheel $P^3$ to vary the inclination of the glass from front to rear, thereby permitting of the formation of a long or short bevel, as is well understood in this art. The balls P and P' constitute an axis centrally of the glass-support and at right angles to the direction of movement in grinding. Thus if a plate S should be thick at one edge and thin at the other, as indicated in Fig. 2, it is a comparatively simple matter to adjust the level of its upper surface by tilting the support $C^2$, together with all the parts mounted thereon, until the desired result is accomplished, and various mechanism may be provided for effecting this end. For the purpose just described it is preferred to provide pivots Q $Q^2$ one at each side of the glass-support in alinement with the ball P, the pivots Q $Q^2$ being journaled in vertically-movable boxes $q$, held in suitable guides or ways $q'$ on the support C'. One of the pivots (that lettered Q) is recessed for the reception of a rock-arm R, having a spherical end and mounted on a rock-shaft R', journaled in bearings $R^2$ on the support C'. The shaft R' has at its forward end a second arm $R^3$, carrying in a suitable rock-bearing $R^4$ an adjusting-screw $R^5$, the latter coöperating with a swing-nut $R^6$ in a bracket $R^7$ on the support C', whereby when the screw $R^5$ is turned, as by a hand-wheel $R^8$, the shaft R' will be moved or turned in one direction or the other, thereby raising or lowering the pivot Q and correspondingly adjusting the inclination of the glass-support $C^2$. The operator may by observing the level K readily adjust the upper surface or face of the glass into a level position, and as the grinder is normally level at the grinding-point a bevel will be formed which will be uniform with respect to the face-surface of the glass and entirely regardless of the rear face or back of the glass.

Obviously the adjusting and indicating mechanisms may be applied or used in connection with any grinding-machine wherein the glass and grinder have a traverse with respect to each other during the grinding operation, although it is quite immaterial as to which one moves in effecting such a traverse. The improvements, however, are especially applicable to that class of grinding-machine wherein the bed against which the glass is positioned is adapted to receive the rear face of the glass, or, in other words, the grinder and the bed against which the glass is positioned are located on opposite sides of the plane of the glass, as in such machines difficulty has been experienced in adjusting or setting the machine for operating upon successive plates varying, as before mentioned, and securing a uniformity of result with reference to the face of the glass plate.

Having thus described our invention, what we claim as new, and desire to secure by Letters Patent, is—

1. In a glass-grinding machine, the combination with a grinder and glass-support located on opposite sides of the plane of the glass, and means for adjusting said support, a clamp for clamping the glass to the support and an indicator for indicating the relative positions of the clamp and support, whereby the glass may be adjusted according to its thickness for presentation to the grinder; substantially as described.

2. In a glass-grinding machine the combination with a grinder, a vertically-movable support for the glass, an indicator for indicating the vertical adjustment of said support and a clamp movable toward and from the support but adjustable vertically therewith, of an indicator for indicating the position of the clamp with respect to the support whereby the thickness of the glass will be indicated by said last-mentioned indicator and the support may be adjusted vertically to bring its indicator into accord therewith to present glass of different thicknesses to the grinder in a uniform position with respect to the face-surface of the glass; substantially as described.

3. In a glass-grinding machine the combination with the grinder, the vertically-adjustable glass-support, means for varying the inclination of said support longitudinally of the grinder whereby the face-surface of the glass may be brought into parallelism with the grinder at the grinding-point and an indicator for indicating the vertical adjustment of the support, of a clamp vertically adjustable with the support but movable toward and from the same and an indicator having graduations corresponding to the graduations of the first-mentioned indicator for indicating the adjustment of the clamp with relation to the support whereby the positioning of glass of different thickness is facilitated; substantially as described.

4. The combination with the vertically-adjustable table, of a glass-grinding machine and the grinder, of a glass-support pivotally mounted on the table on a central axis to vary the inclination of the support in a plane longitudinally of the axis of the grinder and means for adjusting the support on said axis whereby glass of unequal thickness may be presented with its face parallel with the face of the grinder; substantially as described.

5. The combination with the vertically-adjustable table of a glass-grinding machine and the cylindrical grinder, of a glass-support pivotally mounted on a universal joint arranged centrally of the support longitudinally of the grinder, means for adjusting the inclination of the support longitudinally of the grinder and means for adjusting the inclination of the support transversely of the grinder; substantially as described.

6. The combination with the vertically-adjustable table of a glass-grinding machine and the cylindrical grinder, of a glass-support pivotally mounted on the table on a universal joint arranged centrally of the support near one edge, an adjusting mechanism coöperating with the support near the opposite edge and with said universal joint forming an axis for the tilting of the support longitudinally of the grinder and adjusting mechanism for controlling the last-mentioned movement of the support; substantially as described.

7. The combination with the rotary cylindrical grinder, of a glass-support mounted on an axis centrally of the support to tilt in a plane longitudinally of the grinder whereby glass thick at one side and thin at the other may be presented to the grinder with its face side parallel therewith at the grinding-point and means for holding said support in position during the grinding operation; substantially as described.

8. In a glass-grinding machine, the combination with the cylindrical grinder, of a glass-support mounted on an axis centrally of the support to tilt in a plane longitudinally of the grinder to present glass of unequal thickness with its face parallel to the grinder, a clamp-frame mounted on said support to tilt therewith, a clamp carried by said frame and movable toward and from the support, an indicator interposed between the center of the frame and clamp to indicate the mean thickness of the glass held by the clamp and means for adjusting the support vertically according to the indicated thickness of the glass and on its axis according to its inequality in thickness; substantially as described.

9. In a glass-grinding machine, the combination with the cylindrical grinder, of the glass-support pivoted on a central axis to tilt in a plane longitudinally of the grinder, journals at each side of said support mounted in vertically-movable bearings, an arm coöperating with one of said journals to retain the support in its position of adjustment and a screw controlling the position of the arm; substantially as described.

10. In a glass-grinding machine, the combination with the cylindrical grinder, of a glass-support pivoted on a central axis to tilt in a plane longitudinally of the grinder and also on an axis to tilt in a plane transversely of the grinder, journals at each side in line with the last-mentioned axis, an adjusting-screw connected with the support in line with the first-mentioned axis and an adjusting mechanism connected with one of said journals for tilting the support longitudinally of the grinder; substantially as described.

11. In a glass-grinding machine, the combination with the grinder and glass-support, of a clamp movable toward and from the support and an indicator for indicating the thickness of the glass embodying a frame on the clamp and carrying a contact-point, an indicator with which said point engages and a scale with which the indicator registers; substantially as described.

12. In a glass-grinding machine, the combination with the grinder and glass-support, having a clamp-frame above the same, of a clamp, links pivotally connected with the clamp and guided by the frame, a rock-shaft on the frame and an arm on said shaft coöperating with the links to depress the clamp; substantially as described.

13. In a glass-grinding machine, the combination with the grinder and glass-support having a clamp-frame above the same, of a clamp, links pivotally connected to the clamp and pivotally connected with the frame, a rock-shaft journaled in the frame, an arm on said shaft connected with the links and a worm and worm-wheel for moving said shaft to operate the clamp; substantially as described.

CHARLES L. GOEHRING.
WILLIAM TROCHE.

Witnesses:
GRACE M. ZAHNISER,
F. J. STEINERT.